United States Patent [19]
Wright et al.

[11] Patent Number: 5,240,768
[45] Date of Patent: Aug. 31, 1993

[54] ARTICLES CONTAINING METAL FIBERS

[75] Inventors: Robin E. Wright; Peter A. Bellus, both of St. Paul, Minn.

[73] Assignee: Minnesota Mining and Manufacturing Company, St. Paul, Minn.

[21] Appl. No.: 773,985

[22] Filed: Oct. 9, 1991

Related U.S. Application Data

[60] Continuation of Ser. No. 513,839, Apr. 24, 1990, abandoned, which is a division of Ser. No. 272,076, Nov. 16, 1988, Pat. No. 4,940,596, which is a division of Ser. No. 62,437, Jun. 12, 1987, abandoned.

[51] Int. Cl.⁵ ............................................. B32B 5/16
[52] U.S. Cl. ................................. 428/323; 428/422; 428/692; 428/900
[58] Field of Search .............. 428/307.7, 319.9, 312.8, 428/318.4, 319.1, 315.5, 694, 900, 323, 692, 422

[56] References Cited

U.S. PATENT DOCUMENTS

| | | | |
|---|---|---|---|
| 3,597,822 | 8/1971 | Fehlner | 428/307.7 |
| 4,032,682 | 6/1977 | Masson | 428/317.9 |
| 4,163,823 | 8/1979 | Legras et al. | 428/317.9 |
| 4,201,838 | 5/1980 | Goldberg | 428/317.9 |
| 4,450,199 | 5/1984 | Tadokoro | 428/317.9 |
| 4,539,982 | 9/1985 | Bailley | 428/317.9 |
| 4,548,682 | 10/1985 | Yoshida et al. | 204/35.1 |
| 4,618,542 | 10/1986 | Morita et al. | 428/694 |
| 4,761,330 | 8/1988 | Tokushima et al. | 428/694 |
| 4,772,455 | 9/1988 | Izumi et al. | 428/317.9 |
| 4,774,129 | 9/1988 | Komiyama | 428/307.7 |
| 4,839,402 | 6/1989 | Stevens | 428/376 |
| 4,935,296 | 6/1990 | Stevens | 428/317.1 |
| 4,940,596 | 7/1990 | Wright | 427/47 |
| 4,957,943 | 9/1990 | McAllister et al. | 428/315.5 |

FOREIGN PATENT DOCUMENTS 636127  4/1950  United Kingdom .

Primary Examiner—Paul J. Thibodeau
Assistant Examiner—R. Follett
Attorney, Agent, or Firm—Gary L. Griswold; Walter N. Kirn; Lorraine R. Sherman

[57] ABSTRACT

A slurry comprises a ferromagnetic fiber having an aspect ratio of 10 to 10,000 and an organic liquid medium that is unreactive with the metal fibers.

The metal fibers are provided by preparing a mixture comprising a thermally unstable metal complex compound, comprising at least one ferromagnetic metal, in a liquid medium, applying energy to said mixture in the presence of an externally applied magnetic field to decompose said complex compound, and isolating the deposited metal fibers.

Articles are provided by the impregnation of metal fibers of the invention into and onto a porous substrate.

15 Claims, 2 Drawing Sheets

ARTICLES CONTAINING METAL FIBERS

This is a continuation of application No. 07/513,839 filed Apr. 24, 1990, now abandoned, which is a division of application Ser. No. 07/272,076, now U.S. Pat. No. 4,940,596 filed Nov. 16, 1988, which was a division of U.S. Ser. No. 07/062,437, filed Jun. 12, 1987, now abandoned.

FIELD OF THE INVENTION

This invention relates to a process for preparing metal fibers having high length to diameter ratios. In another aspect, this invention relates to an article provided by the impregnation of metal fibers into and onto a porous substrate. In a further aspect, it relates to a slurry of metal fibers in an organic liquid.

BACKGROUND OF THE INVENTION

Production of iron whiskers, which are iron filaments of hair-like cross section, by decomposition of iron pentacarbonyl in a magnetic field has been described in U.S. Pat. Nos. 2,884,319 and 3,570,829 (referred to as the Schladitz technique). Formation of iron whiskers by this technique is also reported in U.S. Pat. Nos. 3,441,408, 3,536,519, 3,915,663, 3,915,663, 3,955,962, 4,002,464, and in German Patent 1,224,934. Other U.S. patents (H. J. Schladitz-inventor) involving metallization are U.S. Pat. Nos. 3,770,492, 3,943,221, 4,076,859, 4,096,823, 4,097,624, and 4,108,108.

Iron whiskers were produced by the reaction of iron halides with carbon black (Kittaka and Kaneko, *Jap. J. Appl. Phys.* 8, 860 (1969)), or iron oxide with coal char (Seaton, Foster, and Valesco, *Trans. Iron Steel Inst. Jap.* 23, 497 (1983)), or iron oxide with hydrogen (Chemical Abstracts, 78 61165q (1973)) or iron halides with hydrogen (Cochardt and Wiedersich, *Naturwissenschaften* 42, 342 (1955)). Whiskers of copper, silver, nickel, and cobalt were also grown by hydrogen reduction of the halides (Brenner, *Acta Metallurgica*, 4, 62 (1956)).

Acicular particles of iron and other metals are produced commercially (Vacuum Metallurgical Co. LTD., Tokyo, Japan) by evaporation of bulk metal into an inert gas under the influence of an applied magnetic field. U.S. Pat. No. 3,206,338 discloses non-pyrophoric, boron-containing acicular ferromagnetic particles.

Metal whiskers have found widespread use as strengthening materials in composites (see U.S. Pat. No. 4,569,886) and, more recently, they have been found to be excellent materials for Electro Magnetic Absorption (EMA) applications. Other uses of acicular metal particles can be found in magnetic recording media, conductive filter media, and catalytic applications. The Schladitz technique has been studied as a means of forming metal whiskers for a number of years. However, a shortcoming of this procedure is that it is a gas phase process requiring high decomposition temperatures employing toxic and flammable metal carbonyls. Such high temperature cannot be used with thermally sensitive substrates. Furthermore, a processing problem in the scale-up occurs due to matting of the whiskers in the reaction chamber so that single, discrete whiskers are not made, rather, bundles are formed. This makes dispersion of the whiskers, especially homogeneous dispersion, difficult, if not impossible.

A. L. Oppegard et al., *Journal of Applied Physics*, Supplement to Vol. 32, No. 3, 1845-1853 (March 1961) disclose a method of preparing single-domain ferromagnetic particles by borohydride reduction of aqueous solutions of ferromagnetic salts. The fibers contain boron and other trace contaminants including halide.

Ultra fine metal particles and powders having diameters in the range of 50 to 2000 A (0.005 to 0.2 micrometer) are disclosed in the references: A. Tasaki et al., *IEEE Transactions on Magnetics*, Vol. Mag-19, No. 5, September 1983, pages 1731-1733, and A. Tasaki et al., *IEEE Transactions on Magnetics*, Vol. Mag-15, No. 6, November 1979, pages 1540-1542.

Slurries of iron particles are disclosed in U.S. Pat. No. 3,228,881. Slurries of chains of iron particles are disclosed in U.S. Pat. No. 3,281,344. There is no mention of slurries of iron fibers or filaments in these references.

SUMMARY OF THE INVENTION

Briefly, the present invention provides a slurry of metal fibers which have aspect ratios from 1 to 10,000, and an organic liquid medium that is unreactive with the metal fibers.

In another aspect, a process for preparing metal fibers comprises decomposing of a thermally unstable ligand stabilized zerovalent metal complex (organometallic complex) in a liquid medium, e.g. a dispersion or solution, in the presence of an applied magnetic field. The process of the invention can provide fibers that comprise one or a mixture of more than one metal, with the proviso that at least one of the metals is ferromagnetic. Preferably, because of ease of preparation, the metal fibers comprise only ferromagnetic metals, i.e., at least one of iron, cobalt, nickel, dysprosium, and gadolinium, most preferably, iron, cobalt, or nickel.

In another aspect, fibers produced in this manner can occupy pores of porous substrates. The fibers themselves are non-porous. The ferromagnetic fibers are deposited in the presence of an externally applied magnetic field onto and into substrates to provide articles such as organic and inorganic porous and non-porous materials, sheet materials and the like. A film containing the fibers displays a hysteresis loop consistent with the fact that the film can be magnetized and demagnetized.

In a further aspect, this invention describes a process for the production of magnetically oriented ferromagnetic metal fibers preferably using a metal atom reactor and supportive techniques. The fibers are produced in the presence of an externally applied magnetic field. The fibers can be amorphous, or microcrystalline, or they can have regions of microcrystallinity; they are generally acicular and have an aspect ratio from about one to about ten thousand. These fibers may be a mixture of two or more metals with the proviso that at least one of the metals is ferromagnetic.

The method of the invention involves preparation of a ligand stabilized zerovalent metal complex using a metal atom reactor (metal atom method), which method takes place in a liquid medium. The metal atom method has many advantages over that discussed in the background art. Shortcomings of the Schladitz technique mentioned above are eliminated with the metal atom method as exemplified by use of metals rather than metal carbonyls as starting materials, presence of liquids to allow formed fibers to remain dispersed in the liquid medium, and direct application of the dispersion to substrates.

Another advantage of the present invention is the ability to generate fibers in the presence of thermally sensitive substrates as exemplified by the ability to impregnate porous substrates with fibers such as the formation and deposition of iron fibers in the pores of, and on, porous polytetrafluoroethylene (Teflon ®, Dupont) membranes. Such an article could not be produced by the Schladitz technique because of the much higher temperatures required. At metal carbonyl decomposition temperatures, the membrane would soften or melt and the integrity of the pores would be lost.

In yet another aspect, the present invention provides a slurry of ferromagnetic metal fibers, the fibers comprising a ferromagnetic metal and optionally 1 to 10 additional metals which are ferromagnetic or non ferromagnetic. The liquid medium of the slurry can be any organic liquid that is unreactive with the metal fibers.

In still another aspect, the present invention provides for passivated metal fibers and articles containing passivated metal fibers.

In a further aspect, the invention provides a method of preparing ferromagnetic metal fibers that have been aligned by an externally applied magnetic field.

The background art discloses the high temperature (above 200° C.) gas phase decomposition of toxic metal carbonyls to provide metal whiskers which contain regions of microcrystallinity. In contrast, the present invention describes ferromagnetic metal fibers having an aspect ratio up to ten thousand, preferably ten to ten thousand, and a metal atom method therefor comprising the relatively low temperature (100° C. or lower and preferably 50° C. or lower) thermal decomposition of organometallic complexes in a liquid medium in the presence of an externally applied magnetic field. The fibers of the present invention are free of halogen, boron, and other non carbon- or non oxygen-containing prior art process related contaminants.

In this application:

"arene" or "aromatic compound" means a six-membered aromatic ring or a 2- or 3-fused ring aromatic compound, such as naphthalene, anthracene, phenanthrene, etc., which may or may not contain substituents such as lower alkyl $C_1$-$C_4$), alkoxy ($C_1$-$C_4$), aryl, biphenyl;

"aspect ratio" means the ratio of length to width;

"organometallic complex" means a complex or compound containing both metal and carbon and which is labile (thermally unstable at temperatures of 100° C. or less); the complex may be stoichiometric or non stoichiometric;

"magnetically oriented" means to be caused to grow in the direction of an applied magnetic field; in the absence of an externally applied magnetic field, fibers are not formed, rather, particles are formed;

"decomposition product" means the metal which is provided by dissociation of a metal-ligand complex;

passivation" means to be made unreactive under conditions in which chemical activity is expected;

"random metal distribution" means without definite plan or pattern as when different metals are provided by the decomposition of organometallic complexes approximately at the same time and in the same temperature range to provide a metal fiber; and "specific metal distribution" means with a definite pattern as when a first, organometallic complex of a ferromagnetic metal decomposes at a given temperature to provide a ferromagnetic fiber; thereafter decomposition of a second metal-containing complex provides a non-random mixture of fibers containing two metals.

DESCRIPTION OF THE DRAWING

The drawing is represented by FIGS. 1 and 2.

DETAILED DESCRIPTION OF INVENTION

Figure 1:
FIG. 1 is a transmission electron micrograph (magnification 74,000 times) of a cross section of a porous Teflon ® (Dupont) membrane into and onto which are deposited magnetically oriented iron fibers, oriented in the direction of the pores, formed from the thermal decomposition of bis(toluene)iron(0) solution in the presence of an externally applied magnetic field (invention).

The present invention provides a slurry comprising ferromagnetic fibers having aspect ratios from 1 to 10,000, preferably from 10 to 10,000, comprising the decomposition product of at least one ligand stabilized zerovalent organometallic complex of a ferromagnetic metal and optionally 1 to 10 additional ligand stabilized zerovalent metal complexes wherein the metal can be ferromagnetic or nonferromagnetic. The ligand can be at least one unsaturated (olefinic or acetylenic) aliphatic or an aromatic compound, for example an arene such as toluene, or an aliphatic compound such as hexene or perfluoro-2-butyne, or it can be any organic solvent capable of forming labile, solvated, zerovalent metal complexes. Each complex has 1 or 2 metal atoms, preferably one, which may be the same or different, and sufficient ligands, generally 1 to 8, to satisfy the coordination requirements of the metal(s). Each complex has a decomposition temperature of 100° C. or lower, preferably 50° C. or lower, most preferably 0° C. or lower. The slurry also contains an organic liquid medium.

The external magnetic field oriented ferromagnetic fibers can comprise more than one metal, at least one of which is ferromagnetic, and wherein the metal distribution is random or specific. Metals which can be present, in addition to a ferromagnetic metal, include transition metals such as Ti, Sc, V, Cr, Mn, Cu, Zn, Y, Zr, Nb, Mo, Ru, Pd, Ag, Cd, Lanthanide series, Hf, Ta, W, Re, Os, Ir, Pt, Au, Hg, and Actinide series, and non-transition elements such as Al, Sn, Ga, Ge, In, Pb, Sb, As, Ga, Bi, Mg, Ba, Ca, Sr, Be. The diameter of the fibers can be in the size range of 0.1 to 100 micrometers and can have an aspect ratio of from about one to about ten thousand, preferably from about ten to ten thousand, and more preferably, from about one hundred to one thousand.

For example, iron can become solvated by toluene, dissolves therein in the form of a labile bis(toluene)iron(0) complex believed to be of the general structure:

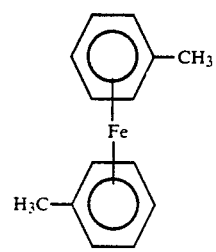

As the labile bis(toluene)iron(0) complex is warmed to a temperature in the range of −50° to −30° C. in the presence of an externally applied magnetic field, the toluene-iron complex dissociates and iron precipitates as magnetically oriented metal fibers.

The decomposition takes place in a liquid medium (which may also serve as the ligand) in the presence of an applied magnetic field.

The complexes containing ferromagnetic metals comprise 10 to 100 weight percent of the total metal content in the thermally unstable solution, preferably 25 to 100 weight percent.

Solvents suitable as a ligand for use in the present invention include, in addition to toluene, organic solvents such as tetrahydrofuran, methyltetrahydrofuran, glyme (dimethyl ether of ethylene glycol), diglyme (dimethyl ether of diethylene glycol), alkenes, acyclic or cyclic dienes e.g. cyclopentadiene, cyclooctadiene, ethers, aromatic hydrocarbons (xylenes, mesitylene, methylnaphthalenes etc.), nitriles such as acetronitrile, and siloxanes. Mixtures of two or more solvents can also be used. Other solvent examples will readily occur to those skilled in the art. Solvent choice is determined by its ability to solvate the chosen metal in zerovalent form, and its ability to provide a complex which decomposes at a temperature of 100° C. or less. Toluene is especially suitable with the platinum group metals, with −100° C. being a suitable operating temperature range for preparing the complex. 1,5-Cyclooctadiene is suitable with iron, cobalt, nickel, palladium and platinum. Tetrahydrofuran and methyltetrahydrofuran are suitable for use with silver and palladium, operating at temperatures in the −90° C. to −125° C. range. Glyme and diglyme, suitable for use with silver, molybdenum and chromium, can be operated at temperatures of −30° C. and −60° C. respectively.

Representative examples of useful ligand stabilized zerovalent complexes of ferromagnetic metals include bis(toluene)iron(0), bis(toluene)nickel(0), bis(toluene)cobalt(0), bis(benzene)iron(0), bis(xylene)iron(0), bis(mesitylene)cobalt(0), bis(naphthalene)iron(0), bis($\alpha,\alpha,\alpha$-trifluorotoluene)iron(0), bis(benzene)nickel(0), bis(xylene)cobalt(0), bis(cyclopentadienyl)($\mu$-cyclooctatetraene)dicobalt, and bis(cyclopentadienyl)($\mu$-cyclopentadienyl)(manganese)(iron).

Representative examples of ligand stabilized zerovalent complexes of non-ferromagnetic metals include bis(1,5-cyclooctadiene)platinum(0), bis(hexafluorobenzene)titanium(0), bis(1,5-cyclooctadiene)palladium(0), (perfluorobut-2-ene)palladium(0), Ag(tetrahydrofuran)$_x$, Zn(glyme)$_x$, Cu(toluene)$_x$, and tris(mesitylene)bis(chromium)(0).

The present invention provides a method for the preparation, in the presence of an externally applied magnetic field, of ferromagnetic metal fibers with diameters in the size range of about 0.1 to about 100 micrometers ($10^3$ to $10^6$A), which have an aspect ratio of from about one to about ten thousand, and articles therefrom, and optionally, methods for their passivation by:

a) providing, in a liquid medium, at least one labile (thermally unstable) ligand stabilized zerovalent metal complex comprising at least one member of the ferromagnetic metals selected from iron, cobalt, nickel, dysprosium, and gadolinium and wherein the ligand is an unsaturated aliphatic or an aromatic compound or it can be any solvent capable of forming labile, solvated zerovalent metal complexes, b) providing an external magnetic field, c) decomposing, by means of energy, the ferromagnetic metal complex to form metal fibers in the provided magnetic field, optionally in the presence of a provided substrate, and d) optionally, passivating the resultant metal fibers by application or exposure to suitable passivation agents.

The metal fibers of the invention are useful as reinforcing fibers for composites, radar absorbing materials, electromagnetic interference (EMI) shielding materials, conductive filter media, magnetic recording media, catalysts, and metallized porous and non-porous substrates.

Preparation of ferromagnetic fibers of this invention begins with the formation of a labile organometallic complex in a liquid medium in an inert atmosphere. The complex is prepared under reduced pressures and at sub-ambient temperatures in a metal atom reactor by the reaction of a suitable metal and an organic compound. In certain cases, the organic compound may also serve as the liquid medium.

Organometallic complexes useful in this invention can also be prepared by means other than by the use of metal atom chemistry. Appropriate organometallic compounds, prepared by reduction of a suitable metal salt with a reductant and in the presence of an arene or reduction of a metal arene salt (e.g. bis toluene)iron(1) hexafluorophosphate) with a reductant, can be decomposed in the presence of an externally applied magnetic field to provide metal fibers of this invention.

The above temperature-, and usually air-, sensitive organometallic complex is then allowed to warm or is caused to be warmed to near or above its decomposition temperature in the presence of an externally applied magnetic field, which in turn, leads to the formation and deposition of specifically oriented metal fibers. The presence of a suitable substrate or substrates in the liquid medium leads to deposition of the metal fibers in and on the substrate. Use of the present invention slurry of metal fibers in a liquid medium provides a useful method for introducing metal fibers in and on a substrate which cannot be readily accomplished using a prior art high temperature gas phase decomposition.

While numerous processes exist for producing iron whiskers, few address the problem of collecting the whiskers in a useful form. For example U.S. Pat. No. 3,441,408 and U.S. Pat. No. 3,955,962 describe the whiskers and the process for making them in the claims, but make mention of the means of collection (scraping the mass from a surface into a container) only superficially in the examples. This is so because these processes are gas phase processes, and collection and manipulation of the whiskers in the gas phase presents difficulty due to the fragility of the whiskers.

A liquid medium as used in the present invention supports the formed metal fibers and minimizes breakage. The use of a liquid medium to support fragile microscopic particles is known, for example, in the processing of microcapsules to prevent breakage and leaking out of the contents. Supporting microcapsules in liquid is readily accomplished because they are formed from a liquid medium. It would be difficult with iron fibers formed by the gas phase process because a large amount of shear is required to break the gas-solid interface at the fiber surface and establish the liquid-solid interface. Such shear force tends to break the fragile metal filaments, reducing the length to diameter ratio and thereby reducing the utility where long lengths (high aspect ratio) are important. Further, a slurry, because of the viscous forces of the liquid, keeps the individual filaments or fibers better separated. This is useful in laying down an even layer of filaments on a substrate or in incorporating the filaments into a resin dispersion.

The liquid medium useful in the slurry of the invention generally may be an organic liquid or liquids which react with the metal vapor, generated in the metal atom reactor, to form the organometallic complex (i.e., a liquid precursor of the organometallic complex compound). Such liquids are referred to above as ligands and include toluene, isomeric xylenes, mesitylene, benzene (caution, iron benzene complex may be explosive) and the like. Other liquids useful are those that are inert and act only as a diluent such as petroleum hydrocarbons such as hexanes, methylcyclohexane, and the like. By liquid medium is meant those chemicals and chemical mixtures that are in the liquid state during the formation and decomposition of the organometallic complexes, regardless whether the preparation of the organometallic complex is by a co-condensation or solution phase mode as defined below. In some instances the liquid medium can be the same as the ligand in the complex.

Substrates useful in this invention are those that are unreactive with the liquid medium or organometallic complex or both and are generally not soluble in the liquid medium. Examples of inorganic substrates are inert materials such as alumina, silica, glass beads, and the like. Example of an organic substrate is Teflon.

Because of the activity of the metal fibers to oxygen of the atmosphere, the metal can be passivated. Passivation of the metal fibers can be brought about in several ways; for example, in a liquid by adding air-saturated liquids, by exposing the metal fibers directly to air (the fibers are pyrophoric, and can react with the oxygen of the atmosphere to form metal oxides; this reaction, when controlled, is an example of passivation of an active surface), and by coating the particles as described for example in U.S. Pat. Nos. 4,073,977 and 4,420,330.

The metal atom reactor used in the practice of this invention is commercially available from Torrovap Ind., Markham, Ontario, Canada. The specific model, TVP 800-1 ™, is a rotary reactor so that appropriate solvents, such as toluene, can be used either as a co-condensate at temperatures where the solvent freezes or as a solution at temperatures above the freezing point where the solvent vapor pressure is sufficiently low. The invention is not limited to rotary reactors, however. The more common static reactor can also provide access to the necessary starting material; see Chapters 1-2 in *Metal Vapour Synthesis in Organometallic Chemistry*, by J. R. Blackborow and D. Young, Springer Verlag, New York, N.Y., 1979. Alternatively, low temperature reduction of metal salts in the presence of an arene or of metal arene cations also gives rise to a precursor organometallic complex.

The product from the metal atom reactor can be transferred or introduced via a cannula into a suitable vessel as described in the Examples. Methods which can be used for the preparation of metal fibers of this invention include a static method (static mode) where the cold solution was allowed to warm in the field of the magnet, and a continuous flow method (flow mode) in which the solution was warmed while caused to flow through the field of the magnet.

The resulting fibers can be kept active, i.e. reactive with oxygen, by separation from the reaction medium in the absence of oxygen under an inert atmosphere. Fibers can also be passivated by using one of several methods. The method most often used involved decanting the supernatant liquid from the fibers, then, before allowing the fibers to dry, washing them with air-saturated toluene and storing under the same. This allowed for slow, somewhat controlled, oxidation of the fiber surface to provide a barrier to further oxidation.

Aspect ratios of the metal fibers of this invention were determined by direct measurements of the fiber lengths from the scanning electron micrographs corrected by the magnification factor used in the scanning electron microscopy (SEM) studies.

The metal fibers of the invention are useful as reinforcing fibers for composites such as in polymers, metals, or ceramics; radar absorbing materials; electromagnetic interference (EMI) shielding materials; conductive filter media; magnetic recording media; and catalysts.

Objects and advantages of this invention are further illustrated by the following examples, but the particular materials and amounts thereof recited in these examples, as well as other conditions and details, should not be construed to unduly limit this invention.

EXAMPLES

All temperatures are in degrees Centigrade unless indicated otherwise.

EXAMPLE 1

This example describes the preparation of bis(-toluene)iron(0).

Iron metal was resistively heated in a rotating metal atom reactor (Torrovap Industries, Markham, Ontario, Canada) which contained approximately 200 mL of dry toluene at $-100°$ C. The pressure maintained during the course of the evaporation was $10^{-4}$-$10^{-5}$ torr. When the amount of iron evaporated was sufficient (1-2 grams), the reactor was backfilled with nitrogen and the liquid filtered cold through a coarse frit. The bis(-toluene)iron(0) containing filtrate, kept at $-78°$ C. under a nitrogen atmosphere, was then used directly in the subsequent decomposition step.

EXAMPLE 2A

This example describes the general method for the formation of magnetically oriented iron fibers by a flow method.

The Fe(toluene)$_2$ solution prepared in Example 1 was caused to flow through a heated tube (which causes decomposition of the bis(toluene)iron(0)) that was positioned through the core of a solenoid magnet typically operated at 5 kilogauss (kG). Flow rates were on the order of 5-10 mL/min. The tube itself could be either a stainless steel needle (15 gauge) or a glass tube with a diameter in the proximity of the magnet's core diameter (up to 5 cm (2 inches)). Controlled heating was provided by circulation of fluid from a temperature controlled bath through an outer jacket or by simply wrapping the tube with insulated nichrome wire and resistively heating. The effluent from the tube contained iron fibers dispersed in the toluene. This was the slurry of the invention. Aspect ratios could be adjusted by varying the temperature of the heat jacket or the flow rate of the solution.

EXAMPLE 2B

This example describes an alternative, static method for the formation of iron fibers.

Fe(toluene)$_2$ prepared as above was allowed to warm in a glass vessel, which was supported in the core of a magnet. A coldfinger, through which water could be circulated, was inserted into the vessel. The rate of decomposition could be adjusted by changing the temperature of water circulating through the probe. Fibers formed using this static method tended to be more matted than those formed by the flow method and often appeared as sheets of fibers around the probe.

EXAMPLE 3

This example describes a typical temperature and magnetic field strength used in a flow method for the formation of iron fibers.

Bis(toluene)iron(0) was made as described above. When the arene solution was caused to flow through a heated tube at 25° C. in a 5 kG field, iron fibers were formed having aspect ratios up to 1000.

EXAMPLE 4

This example describes the formation of iron fibers prepared in static method.

Bis(toluene)iron(0) was decomposed by simply allowing a cold solution to warm to room temperature in the cavity of an electromagnet that is a part of a commercial electron paramagnetic resonance (EPR) spectrometer (Varian Model V-4502-06, Varian Associates Palo Alto, Calif.) operated at 10 kG. Bundles of long iron fibers were produced which were highly tangled.

EXAMPLE 5

This example describes the production of cobalt fibers.

Cobalt (267 mg) was evaporated into 200 mL toluene to give bis(toluene)cobalt(0) following the procedure of Example 1. The complex was then decomposed by a static method in a reactor with an internal probe at 35° C. and a 5 kG applied field to give Co fibers with 0.15 micrometer diameter and length of less than 15 micrometers.

EXAMPLE 6

This example describes the production of nickel fibers.

Bis(toluene)nickel(0) was prepared by evaporating 190 mg Ni into 175 mL toluene and allowed to warm by a static method in a reaction vessel in the applied field (5 kG) of a solenoid magnet with the probe at 35° C. to give Ni fibers having comparable size and shape to those of the Co fibers.

EXAMPLE 7

This example describes the production of mixed metal fibers.

Iron (367 mg) and cobalt (183 mg) were co-evaporated into 200 mL toluene to give a solution containing both Fe(toluene)$_2$ and Co(toluene)$_2$. Upon warming by a static method in a reactor with the probe at 35° C. and a 5 kG applied field, fibers were formed which contained both Co and Fe, as shown by electron spectroscopy for chemical analysis (ESCA).

EXAMPLE 8

This example describes how ligands other than toluene were used to provide fibers.

Iron (1.4 g) was evaporated into 200 mL of mixed xylenes to give Fe(xylene)$_2$, which was allowed to warm in the cavity of an EPR magnet operating at 5 kG, and provided long strands of iron fibers.

EXAMPLE 9

This example describes how resistance heating was employed to warm a ligand stabilized zerovalent metal complex solution in the presence of an applied magnetic field to provide fibers.

Iron (1.8 g) was evaporated into 180 mL toluene and the solution then flowed through a 15 gauge needle with a length of 30.5 cm (12 inches) inserted in the core of a solenoid magnet operating at an applied field of 2 kG. External heating means was provided by a coil of insulted nichrome wire around the needle using a thermocouple to monitor the temperature on the outside of the needle. A current of 0.6 amps, and a 35° C. temperature was maintained. At a flow rate of 5-10 mL/min, fibers were obtained in the effluent.

EXAMPLE 10

This example describes the deposition of magnetically oriented iron fibers in the pores of, and on a porous Teflon (Dupont) membrane.

The apparatus used for this example comprised a suitable glass vessel with pressure and evacuation means. The vessel had an adequate reservoir and sealed to the inside wall of the vessel was a glass frit as a first support means for supporting a disk-shaped porous Teflon membrane. The apparatus also had a pre-calibrated thermocouple, a stainless steel cannula used as a transfer means to transfer the thermally unstable solution, and a second support means to support the apparatus within the cavity of an external magnet such that when a magnetic field of about 5 kG was applied, the resultant magnetic field had its lines of flux in the direction of the pore axis of the porous membrane to allow generation of iron fibers within the pores. The apparatus further had an external heating means and a means for connecting the thermocouple to the heating means. The heating means externally surrounded and contacted the glass vessel at the site of the membrane.

On the frit was placed a disk-shaped porous Teflon membrane (commercially available from Nucleopore Corp., Pleasanton, Calif.) which was covered with about 3-10 mm thick layer of inert glass spheres to help support, and into which was inserted the thermocouple such that the temperature in the vicinity of the membrane could be determined. About 100 ml of a cold (about −60° C., to prevent decomposition) toluene solution of Fe(toluene)$_2$ as prepared above was introduced as a stream into the center of the sphere-covered membrane by means of the cannula such that this solution was caused to decompose at the membrane site by the externally applied heating means (a temperature of about 40° C. was maintained) and deposited iron fibers into the pores of, and onto the membrane. The membrane was removed from the vessel and stored under toluene.

A portion of the resultant membrane was visually examined and it was apparent that the density of metal fibers was greater at the surface and at the edges than at the center of the disk, which is consistent with, and explained by the fact that external heating resulted in a thermal gradient from the edge to the center of the disk. Transmission electron microscopy (TEM) of the resultant membrane showed the presence of iron fibers throughout the cross-section of the membrane and that the fibers were oriented or aligned and were within the pores of the porous membrane as shown in FIG. 1. This composite can be used as a radar absorbing material, as an EMI shielding material, or as a supported catalyst.

EXAMPLE 11

This example serves as a control and describes the deposition of randomly oriented iron particles in the pores of, and on a porous Teflon membrane. In the absence of an externally applied magnetic field, particles instead of fibers were formed.

The apparatus and methods used in this example were those used in Example 10 with the exception that a magnet was not used; i.e., particles were randomly deposited because of the absence of an external magnetic field. Addition of the thermally unstable solution onto a porous membrane exactly as described in Example 10 in the absence of an externally applied magnetic field provided a membrane having randomly oriented iron particles in the pores of and on the Teflon membrane as indicated in FIG. 2.

TEM indicated iron particles were throughout the cross section of the membrane. Again, the particles were concentrated on the surface, and near the edge of the disk for the reasons explained in Example 10. Furthermore, because the particles were randomly deposited, they had a tendency to block the pores of the porous membrane and did not allow as much solution to pass through and decompose to iron particles in the membrane pores.

Figure 2:
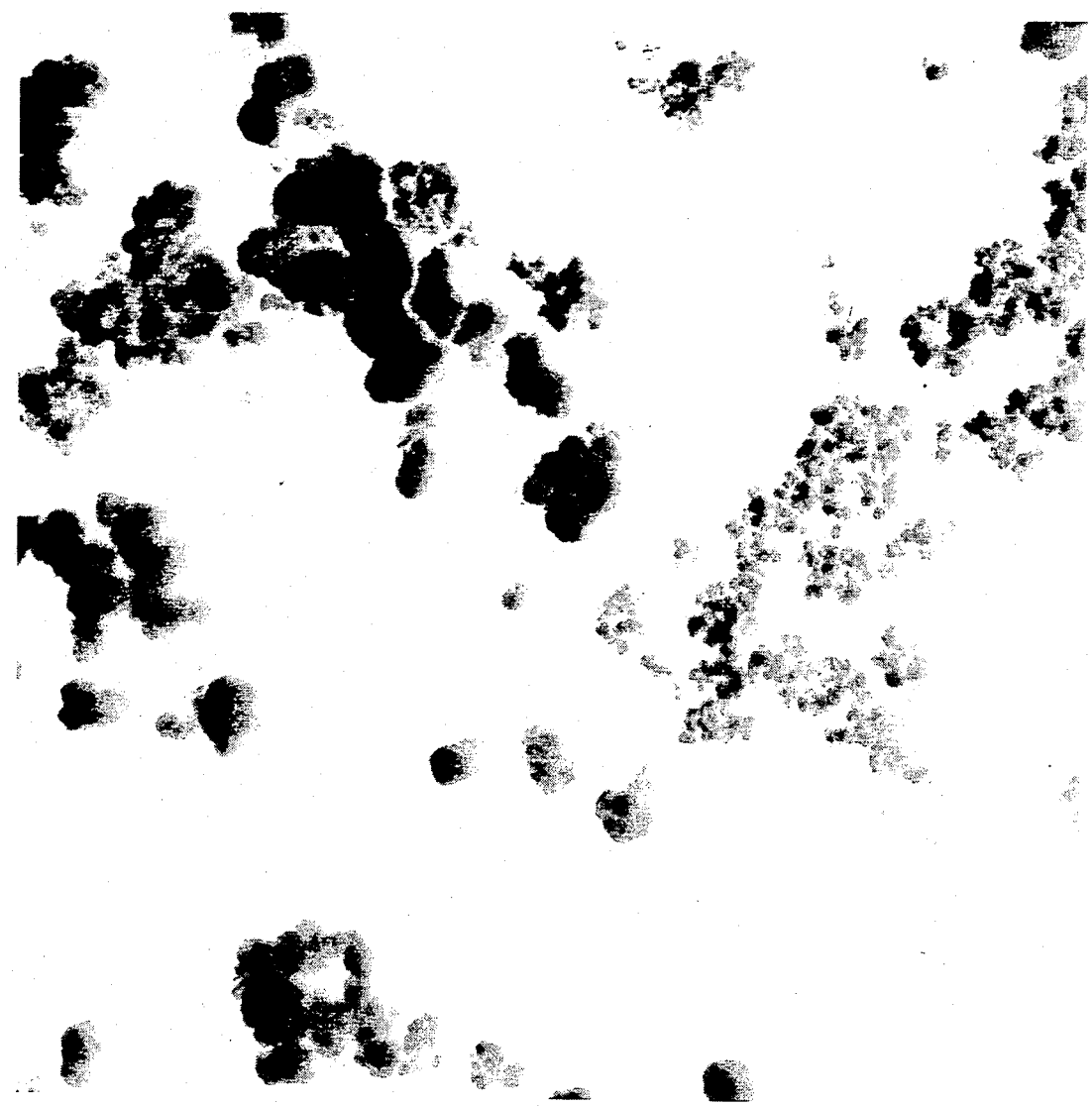
FIG. 2 is a transmission electron micrograph (magnification 74,000 times) of a cross section of a porous Teflon ® membrane into and onto which are randomly deposited iron particles formed from the thermal decomposition of bis(toluene)iron(0) solution in the absence of an externally applied magnetic field (comparative).

In comparing FIGS. 1 and 2, it can be seen that the fibers in FIG. 1, grown aligned due to the externally applied magnet field. Fibers form only in the presence of an externally applied magnetic field. In the absence of a magnetic field the particles (FIG. 2) can be seen randomly distributed on the substrate and in the pores.

EXAMPLE 12

This example shows that a film containing the iron fibers of the invention displayed a hysteresis loop and can be used as magnetic recording media.

A dispersion of iron fibers in toluene, made as described in Example 2A, was combined with enough tridecylpolyethyleneoxide phosphate ester (molecular weight 700 g/mole) to give a 7 percent by weight (to metal) mixture. Toluene was then added to make a 70 percent solids (dispersant plus pigment) solution. This slurry was ball-milled for 45 minutes using 25 g steel shot (0.32 cm diameter) to aid in dispersing the fibers. The product was then diluted with a solution containing 75 parts by weight vinyl chloride-vinyl acetate copolymer (VYHH ™, Union Carbide) and 25 parts by weight dioctyl phthalate and with methyl ethyl ketone to give a 45 percent solids solution. This was ball-milled an additional 15 minutes. The final solution was hand spread onto 25.4 micrometer thick (1 mil) polyester, applying a longitudinal field of 1600 gauss. After drying at room temperature to provide an iron fiber-containing film; the magnetization curve (M-H curve) was obtained with a maximum applied field of 3 kOe (kilo-Oersteds).

This result showed that the film displayed a hysteresis loop consistent with the fact that film can be magnetized and demagnetized and can be used as magnetic recording media.

Various modifications and alterations of this invention will become apparent to those skilled in the art without departing from the scope and spirit of this invention, and it should be understood that this invention is not to be unduly limited to the illustrative embodiments set forth herein.

We claim:

1. An article comprising:
   a) a solid substrate having pores therein, and
   b) deposited in the pores of said substrate and on said substrate magnetically aligned ferromagnetic metal fibers having a diameter in the range of 0.1 to 100 micrometers and an aspect ratio in the range of 10 to 10,000.

2. The article according to claim 1 wherein said magnetically aligned ferromagnetic metal fibers further comprise nonferromagnetic metals.

3. The article according to claim 1 wherein said ferromagnetic metal is at least one selected from the group consisting of iron, cobalt, nickel, dysprosium and gadolinium.

4. The article according to claim 2 wherein said nonferromagnetic metal is a transition metal.

5. The article according to claim 4 wherein said nonferromagnetic metal is at least one selected from the group consisting of Ti, Sc, V, Cr, Mn, Cu, Zn, Y, Zr, Nb, Mo, Ru, Pd, Ag, Cd, Hf, Ta, W, Re, Os, Ir, Pr, U, and Hg.

6. The article according to claim 4 wherein said nonferromagnetic metal is at least one selected from the group consisting of Al, Sn, Ga, Ge, In, Pb, Sb, As, Ga, Bi, Mg, Ba, Ca, Sr, and Be.

7. The article according to claim 1 wherein said aspect ratio is in the range of 100 to 1000.

8. An article comprising:
   a) a porous substrate, and
   b) deposited in the pores of said substrate and on said substrate magnetically aligned ferromagnetic metal fibers having an aspect ratio in the range of 10 to 10,000, wherein said fibers are passivated.

9. The article according to claim 8 wherein said magnetically aligned ferromagnetic metal fibers further comprise nonferromagnetic metals.

10. The article according to claim 8 wherein said ferromagnetic metal is at least one selected from the group consisting of iron, cobalt, nickel, dysprosium and gadolinium.

11. The article according to claim 9 wherein said nonferromagnetic metal is a transition metal.

12. An article comprising:
    a) a porous substrate, and
    b) deposited in the pores of said substrate and on said substrate magnetically aligned ferromagnetic metal fibers having an aspect ratio in the range of 10 to 10,000, wherein said substrate is polytetrafluoroethylene.

13. The article according to claim 12 wherein said magnetically aligned ferromagnetic metal fibers further comprise nonferromagnetic metals.

14. The article according to claim 12 wherein said ferromagnetic metal is at least one selected from the group consisting of iron, cobalt, nickel, dysprosium and gadolinium.

15. The article according to claim 13 wherein said nonferromagnetic metal is a transition metal.

* * * * *

UNITED STATES PATENT AND TRADEMARK OFFICE
CERTIFICATE OF CORRECTION

PATENT NO. : 5,240,768
DATED : August 31, 1993
INVENTOR(S) : Robin E. Wright

It is certified that error appears in the above-identified patent and that said Letters Patent is hereby corrected as shown below:

On the Cover Sheet, delete Peter A. Bellus as one of the named inventors.

On the Cover Sheet, under [56] References Cited, U.S. Patent Documents, add:

| | | | |
|---|---|---|---|
| -- 2,884,319 | 4/1969 | Fabian et al. | 75/5 |
| 3,570,829 | 3/1971 | Schladitz | 266/1 |
| 3,441,408 | 4/1969 | Schladitz | 75/208 |
| 3,536,519 | 8/1967 | Glass | 117/46 |
| 3,915,663 | 10/1975 | Glass | 29/182.2 |
| 3,955,962 | 5/1976 | Dawihl et al. | 75/5 |
| 4,002,464 | 1/1977 | Dawihl et al. | 75/5 |
| 3,770,492 | 11/1973 | Schladitz | 117/107.2 |
| 3,943,221 | 3/1976 | Schladitz | 261/142 |
| 4,076,859 | 2/1978 | Schladitz | 427/55 |
| 4,096,823 | 6/1978 | Schladitz | 118/40 |
| 4,097,624 | 6/1978 | Schladitz | 427/251 |
| 4,108,108 | 8/1978 | Schladitz | 118/49.1 |
| 3,206,338 | 9/1965 | Miller et al. | 148/105 |
| 4,569,886 | 2/1986 | Divecha et al. | 428/379 |
| 3,228,881 | 1/1966 | Thomas | 252/62.5 |

UNITED STATES PATENT AND TRADEMARK OFFICE
CERTIFICATE OF CORRECTION

PATENT NO. : 5,240,768

DATED : August 31, 1993

INVENTOR(S) : Robin E. Wright

It is certified that error appears in the above-identified patent and that said Letters Patent is hereby corrected as shown below:

3,281,344    10/1966    Thomas    204/158

4,279,945    7/1981    Audran    427/130

4,632,866    12/1986    Kubota et al.    428/328

4,070,505    1/1978    Baril et al.    427/128

4,273,807    1/1981    Berry    427/132 --

Under [56] References Cited, Foreign Patent Documents, add

-- 1,224,934    3/1967    Germany --

Under [56] References Cited, Other Documents, add

-- Kittaka and Kanedo, *Jap. J. Appl. Phys.*, 8, 860 (1969)

Seaton, Foster, and Valesco, *Trans. Iron Steel Inst. Jap.*, 23, 497 (1983)

Chemical Abstracts, 78, 61165q (1973)

Cochardt and Wiedersich, *Naturwissenschaften*, 42, 342 (1955)

Brenner, *Acta Metallurgica*, 4, 62 (1956)

UNITED STATES PATENT AND TRADEMARK OFFICE
CERTIFICATE OF CORRECTION

PATENT NO. : 5,240,768
DATED : August 31, 1993
INVENTOR(S) : Robin E. Wright

It is certified that error appears in the above-identified patent and that said Letters Patent is hereby corrected as shown below:

A. L. Oppegard et al., _Journal of Applied Physics_, Supplement to vol. 32, No. 3, 1845-1853 (March 1961)

A. Tasaki et al., _IEEE Transactions on Magnetics_, Vol. Mag-19, No. 5, September 1983, pp. 1731-1733

A. Tasaki et al., _IEEE Transactions on Magnetics_, Vol. Mag-15, No. 6, November 1979, pp. 1540-1542 --

Col. 3, line 39, "alkyl $C_1-C_4$)," should read -- alkyl $(C_1-C_4)$, --.

Col. 3, line 53, "passivation"" should read -- "passivation" --.

Col. 6, line 34, "(e.g. bis toluene)iron(1)" should read -- e.g. bis(toluene)iron(1) --.

Col. 11, line 39, "grown" should read -- grow --.

Signed and Sealed this

Fifteenth Day of November, 1994

Attest:

BRUCE LEHMAN

Attesting Officer    Commissioner of Patents and Trademarks